United States Patent [19]
Wagner

[11] Patent Number: 5,452,671
[45] Date of Patent: Sep. 26, 1995

[54] EQUIPMENT AND PROCESS FOR ULTRA HAZARDOUS LIQUID AND GAS MOLECULAR DECOMPOSITION

[76] Inventor: Anthony S. Wagner, 13709 Hwy. 71 West, Bee Caves, Tex. 78738-3117

[21] Appl. No.: 319,640

[22] Filed: Oct. 7, 1994

Related U.S. Application Data

[63] Continuation-in-part of Ser. No. 103,122, Aug. 9, 1993, Pat. No. 5,359,947, which is a continuation-in-part of Ser. No. 982,450, Nov. 27, 1992, Pat. No. 5,271,341, which is a continuation-in-part of Ser. No. 669,756, Mar. 15, 1991, Pat. No.5,167,919, which is a continuation-in-part of Ser. No. 524,278, May 16, 1990, Pat. No. 5,000,101.

[51] Int. Cl.⁶ .................................................. F23G 7/00
[52] U.S. Cl. ........................ 110/346; 588/201; 110/237; 110/235
[58] Field of Search ........................ 110/237, 242, 110/255, 289, 116, 118, 235, 236, 346; 588/201

[56] References Cited

U.S. PATENT DOCUMENTS

| | | | |
|---|---|---|---|
| 5,237,940 | 8/1993 | Pieper et al. | 110/165 A |
| 5,322,547 | 6/1994 | Nagel et al. | 110/346 |

*Primary Examiner*—Denise L. Gromada
*Assistant Examiner*—Susanne C. Tinker
*Attorney, Agent, or Firm*—Joseph F. Long

[57] ABSTRACT

Equipment and process for dissolving a metal container filled with ultra hazardous liquids and gases underneath a molten alloy surface at a temperature of about 800° C. in order to completely molecularly decompose and react resultant product of the hazardous liquids and gases to allow environmentally safe discharge of the final non-hazardous products.

13 Claims, 6 Drawing Sheets

EQUIPMENT AND PROCESS FOR ULTRA HAZARDOUS LIQUID AND GAS MOLECULAR DECOMPOSITION

This application is a continuation-in-part of Ser. No. 08/103,122 filed Aug. 9, 1993 entitled "Equipment and Process for Waste Pyrolysis and Off-Gas Oxidative Treatment", now U.S. Pat. No 5,359,947, which is continuation-in-part of Ser. No. 07/982,450, filed Nov. 17, 1992 and entitled "Equipment and process for Medical Waste Disintegration and Reclamation", now U.S. Pat. No 5,271,341, and which is a C.I.P. of Ser. No. 07/699,756, filed Mar. 15, 1991 entitled "Waste Treatment and Metal Reactant Alloy Composition", now U.S. Pat. No. 5,167,919, which in turn is a C.I.P. of Ser. No. 524,278, filed May 16, 1990, entitled "A Hazardous Waste Reclamation Process," now U.S. Pat. No. 5,000,101.

BACKGROUND

The closest prior art to the present invention is probably Ser. No. 08/103,122 entitled "Equipment and Process for Waste Pyrolysis and Off-Gas Oxidative Treatment" but differs significantly in that process and equipment is designed to treat ultra hazardous chemicals by dissolution of the chemicals and of the chemical container well beneath the surface of a molten alloy both with a specially designed dunker or distribution unit to give maximum contact with a molten alloy of the ultra hazardous chemicals and products formed with the molten alloy. A similar alloy composition to Ser. No. 08/103,122 which is incorporated herein by reference may used. This composition is:

| | |
|---|---|
| 50–100 | percent aluminum |
| 0–20 | percent calcium |
| 0–50 | percent zinc |
| 0–50 | percent iron |
| 0–50 | percent copper |

Components of the alloy may be of low purity. Scrap aluminum should be quite satisfactory.

Large volumes of ultra hazardous chemicals such as nerve gas exist and equipment in this process is specifically designed to allow safe, complete destruction to harmless, environmentally innocous products.

In this process the alloy may be heated and held molten by electrical induction heating or by fossil fuel. The alloy is held at approximately 750° to 900° C. by continuous heating.

Above 800° C. essentially all organic materials, including organic pathogens, are broken down into carbon and gaseous products. Negative ions such as chlorine, bromine, etc., in the organic compounds will react with the alloy and be held as non volatile salts. The carbon, and hydrogen and, other oxidizable products, if present after pyrolysis are oxidized in the oxidation chamber. Glass will melt and metal will dissolve or remain in the molten bath. Water in the form of steam will pass into the aqueous scrubber. Normally negative ions such as chlorine will be held by calcium in the alloy; however salts that sublime would also be removed in aqueous scrubber.

Periodically, the molten bath must be replaced in order to reclaim the metals. The molten bath may be allowed to drain out of the reactor or pumped into collection vessels for later use in the metal industry. Molten glass may skimmed off the surface of the molten alloy. Air is essentially excluded from the pyrolysis unit and the small amount of air in the waste as charged reacts to oxidize carbon to carbon monoxide or dioxide.

SUMMARY OF THE INVENTION

The invention comprises equipment and process to completely disintegrate molecules of ultra hazardous chemicals. Aluminum or aluminum alloy containers will dissolve in the 800°–850° molten aluminum alloy. Cardboard or plastic containers will disintegrate in the bath. A specially designed dunker or submerser unit is used to push the container below the molten alloy surface and provide a maximum path through the molten aluminum of the decomposition products of the enclosed chemicals to insure complete decomposition. In one embodiment the container is punctured and gas purged into the molten alloy before submersing the container to dissolve in the alloy.

The alloy composition may be varied for particular treatment but, in general contains aluminum, copper, iron, zinc, and calcium. Calcium is used to hold chloride which would otherwise form a volatile aluminum trichloride.

After the aluminum alloy treatment the resulting off-gas products are, in one embodiment, carried through a ceramic section of the off-gas line that is heated about 800° C. and then into an oxidation chamber followed by a scrubbing system. The off-gas from the final aqueous scrubber should contain only nitrogen, carbon dioxide and some oxygen as excess oxygen may be used in the oxidation system.

DETAILED DESCRIPTION OF THE INVENTION

The process and equipment of the invention may be best described from the drawings.

Figure 1:
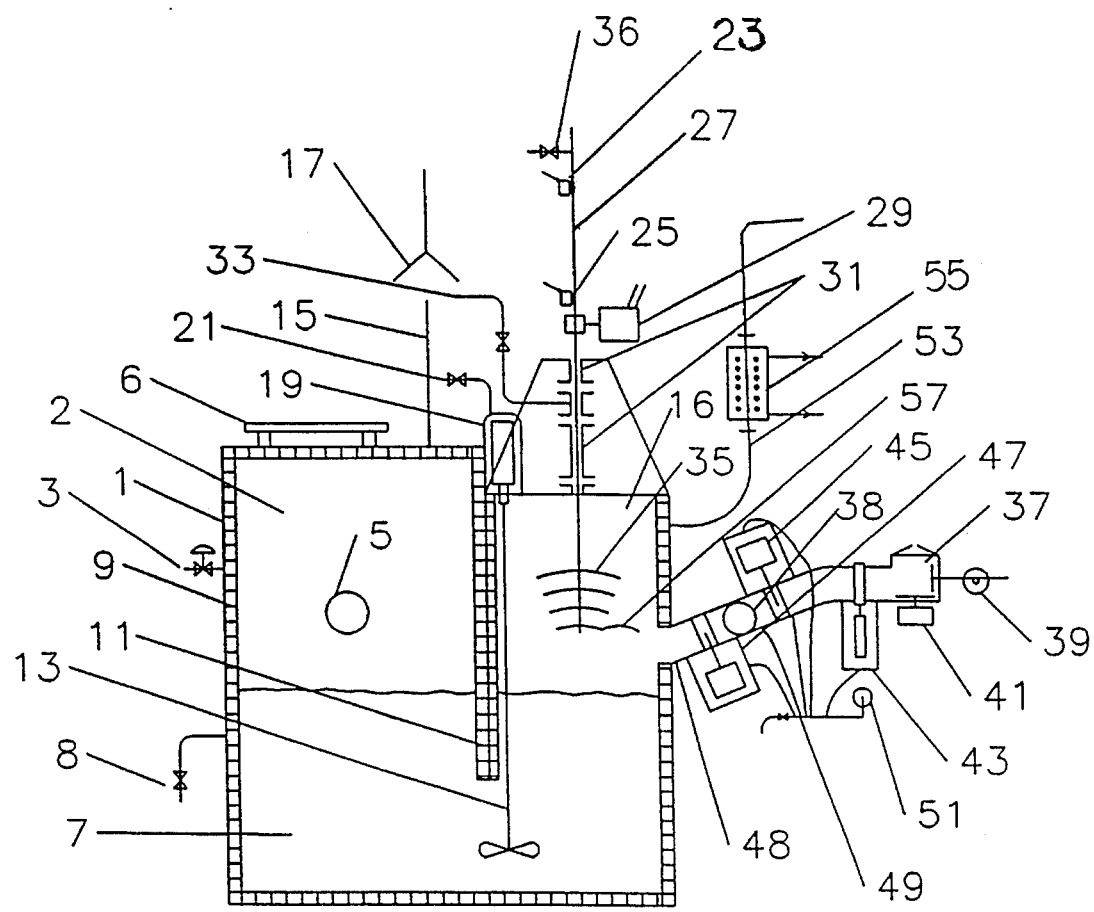
FIG. 1 shows a cross section of a front view of dual chamber treatment unit.

In FIG. 1 we've shown a sectional view of a dual chamber unit that is preferably made of a stainless steel such as 316 and ceramic lined. Ceramic lining 9 of a first or burner chamber 2 is necessary because burners 3, which may be one or more, heat aluminum alloy 7 from above the surface to a molten state with heat from the burners 3 and radiant heat from the ceramic lining 9. The air-fuel mixture to the burners 3 is automatically controlled to maintain a minimum of excess oxygen after combustion. Flue gas line 15 may discharge below a hooded cone shaped metal skirt 17 to aspirate air and cool the exit gas before entering the atmosphere. Waste heat could be utilized to form steam at or below this point by a properly designed exchanger or could be utilized directly for building heat by an air-gas exchanger.

Charging port 6 may be hinged and sealed to allow easy addition of the alloy components. Viewing port 5 serves to allow visual checking of the burner adjustment and state of alloy 7. Molten alloy draw off 8 may be used to adjust level of alloy 7 to be below feed chute 48 and above the end of baffle 11. This is necessary to seal gases in the first chamber 2 from gases in the melting and decomposition chamber 16.

Figure 3:
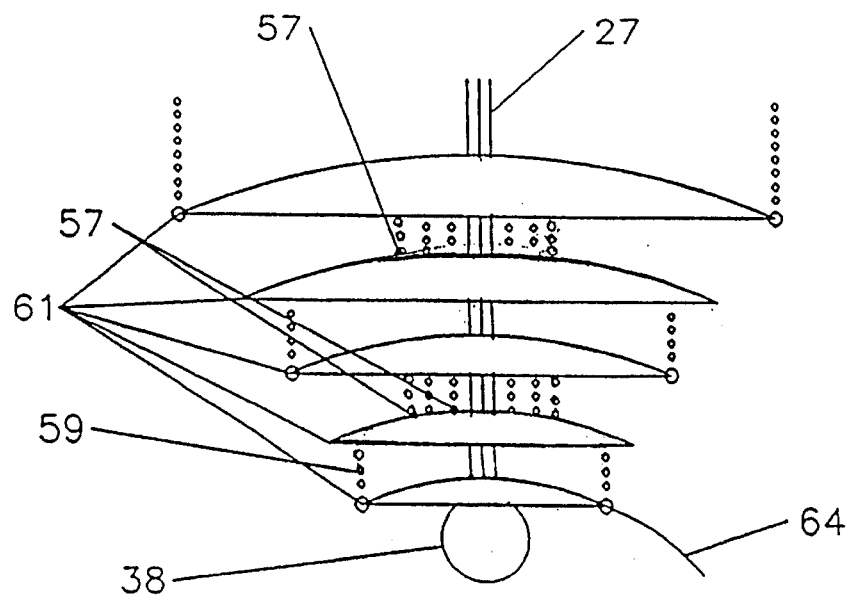
FIG. 3 shows an end view of a dunker indicating gas path.

A pump type stirrer 13 may be installed vertically as shown or through the sidewall to mix the molten alloy 7 to prevent excessive cooling below the melting and decomposition or 2nd chamber 16. The stirrer 13 must be below the greatest depth reached by dunker 35. Dunker 35 is shown in FIG. 3 and described in more detail later. Stirrer 13 is motor driven with covering 19 for motor drive and inert gas purge 21 controlled to prevent any outward seal leakage.

Shaft 27 for dunker 35 may be motor and gear driven 29 with limit switches 23 and 25 determining upper and lower level of travel. Inert gas purge 33 between shaft seals 31 prevents any outward leakage of gas from chamber 16. Inert gas purge 36 allows purging through hollow shaft 27 into dunker 35. This purge may be continuous.

Figure 5:
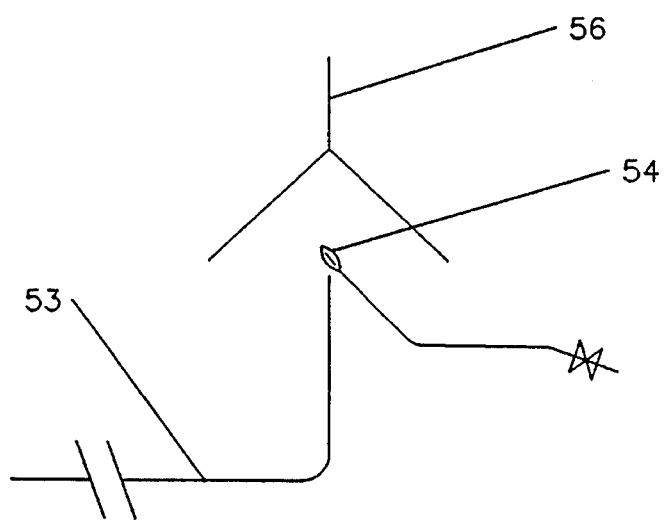
FIG. 5 shows one embodiment of an off-gas treatment unit.
Figure 6:
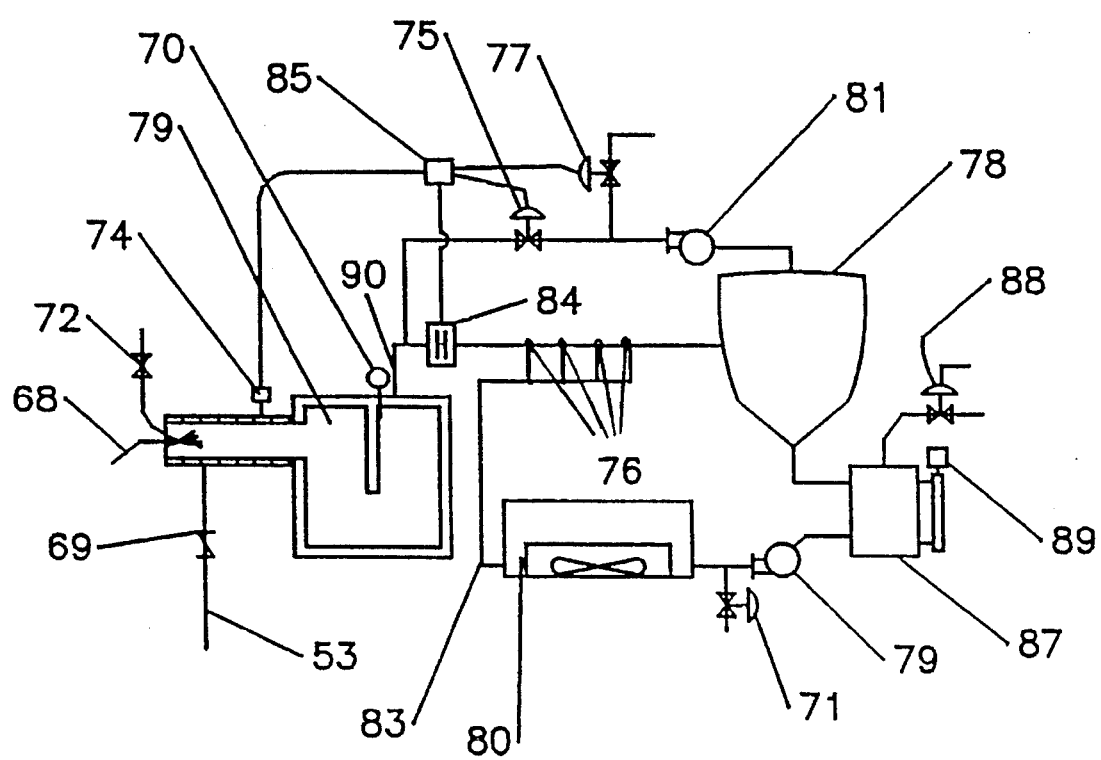
FIG. 6 shows an off-gas oxidative and scrubbing unit.

Feed chamber 37 may have dual doors to automatically open to admit a container 38 for ultra hazardous chemicals. With ultra hazardous container 38 being treated it may be desirable to check weight of each. Scale 41 allows such checking. Pusher 39 which may be gear driven is preferably interlocked to push container 38 out of feed chamber 37 past gas tight slide gate 43 into a chamber between slide gate 43 and slide gate 45 after chamber 37 is purged (not shown) and when slide gate 45 is closed and slide gate 43 is opened. At end of travel of pusher 39 slide gate 43 automatically closes. Incline of feed chute 48 is such that container 38 will move into the chamber between slide gate 45 and slide gate 47 when slide gate 45 is opened. Slide gate 47 is interlocked to prevent opening until dunker 35 is in the uppermost position. Operation of slide gate 47 may also be manually controlled. Dunker 35 with guide arms 57 is controlled by limit switches 23 and 25 to submerse container 38 below the surface of molten alloy 7. As gasses from decomposition escape they must bubble through a tortuous path in the molten alloy 7 to escape through serrated edges of the dunker 35 and through off-gas line 53. Inert gas header 49 with gauge 51 may be used to furnish inert gas purge to the housings covering slide gate valves 43, 45, and 47 and chambers in between. Purge of inert gas through dunker 35 assures all gases formed will bubble through molten alloy 7. We expect the carbon formed may be partially deposited in the dunker 35 and partially carried out off-gas line 53. In one preferred embodiment an induction heated ceramic section 55 may act as clean up by being heated to above 400°–800° C. for decomposition of hazardous molecules. In other embodiments further treatment is included as shown in FIGS. 5 and 6.

Figure 2:
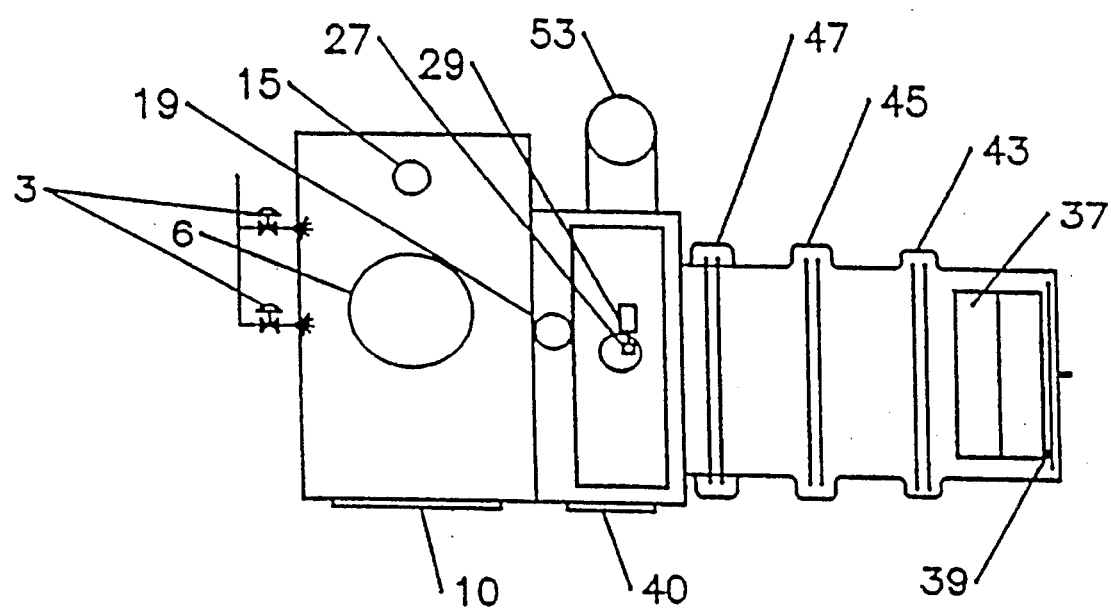
FIG. 2 shows a top view of the treatment unit.

FIG. 2 shows a top view of unit 1 indicating approximate shape for a unit designed to dissolve long cylinders of ultra hazardous chemicals while at the same time decomposing the chemicals in molten alloy. All the parts have been previously shown and explained except slag doors 10 in chamber 2 and slag door 40 in chamber 16. These doors should be well insulated and make an air tight closure. They may be opened to remove slag that may form on the surface of alloy 7.

In FIG. 3 we show an end view of a preferred embodiment for shape of dunker 35 for use in submersing cylindrical containers. The unit consists of elongated dished baffles 61 with openings or holes 57 in alternate baffles and may be made of ½" thick stainless steel and ceramic coated. An external rib may be welded to the baffle and shaft 27 for added strength. Holes 57 in the baffles cause off-gas bubbles 59 to travel an elongated path for maximum alloy contact. Guide arms 64 serve to guide container 38 to be directly under shaft 27.

Figure 4:
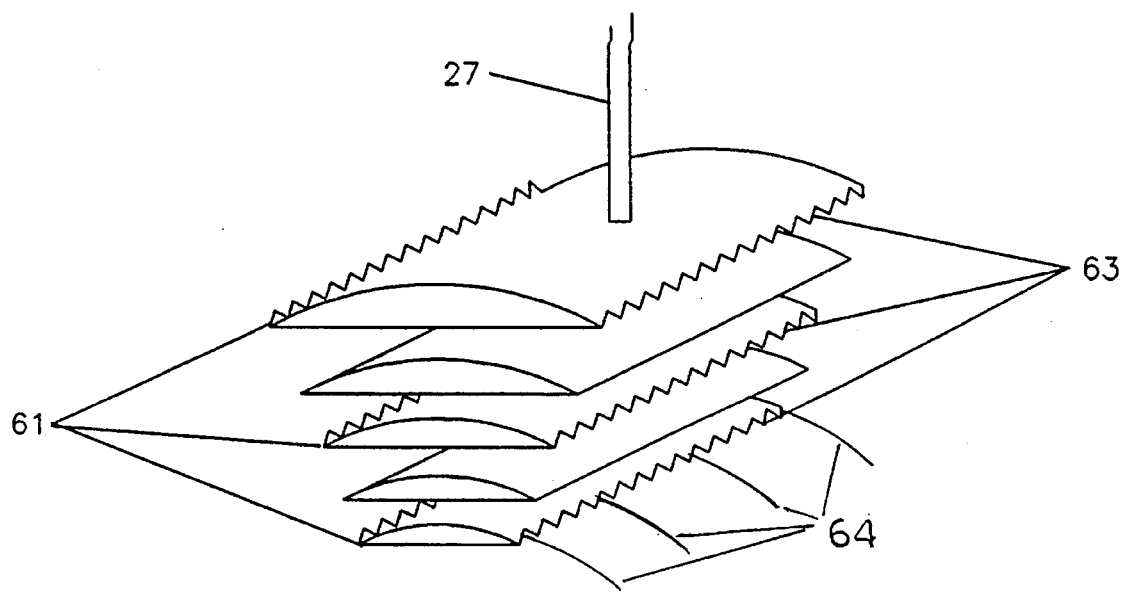
FIG. 4 shows a three dimensional view of the dunker or submersor unit.

In FIG. 4 we show a three dimensional view of dunker 35. Alternate baffles 61 have serrated edges 63 to cause gas to break into small bubbles to travel upward through alloy 7.

In FIG. 5 we show one treatment for exit gas 53 from the heating and decomposition chamber 55. In this system the hot exit gas from chamber 55 leads to an open cone shaped chamber equipped with pilot burner 54 causing the hydrogen and carbon normally present in exit gas to be burned as the air mixture is thermally aspirated through vent line 56.

In FIG. 6, which is a preferred embodiment of an oxidative off-gas treatment system, the off-gas through line 53 goes through a check valve 69, with two check valves in series being preferred, to exit into a flame from burner 68. Before feeding a container 38, FIG. 1 into the decomposition unit, burner 68 is used to heat oxidation chamber 79 to above about 400° C. as indicated by temperature gauge 70. Controller 85 with blower 81 in operation may control recycle control valves 75 and vent valve 77 to maintain a slight negative pressure as indicated by gauge and sensor 74 in oxidation chamber 79. Exit gas comprising products of combustion of carbon, hydrogen and any other combustible components exits oxidation chamber 79 through line 90 and flowmeter 84 to sprays from spray nozzles 76 to cyclone separator 78. Scrubbing liquid drains from cyclone separator 78 to hold up tank 87. Level controller 89 acts to add water to the system through valve 88. Water from the system may be removed through drain 71. With pump 79 operating hot water is recycled through air cooler 80 to feed cool water through line 83 to spray nozzles 76.

Figure 7:
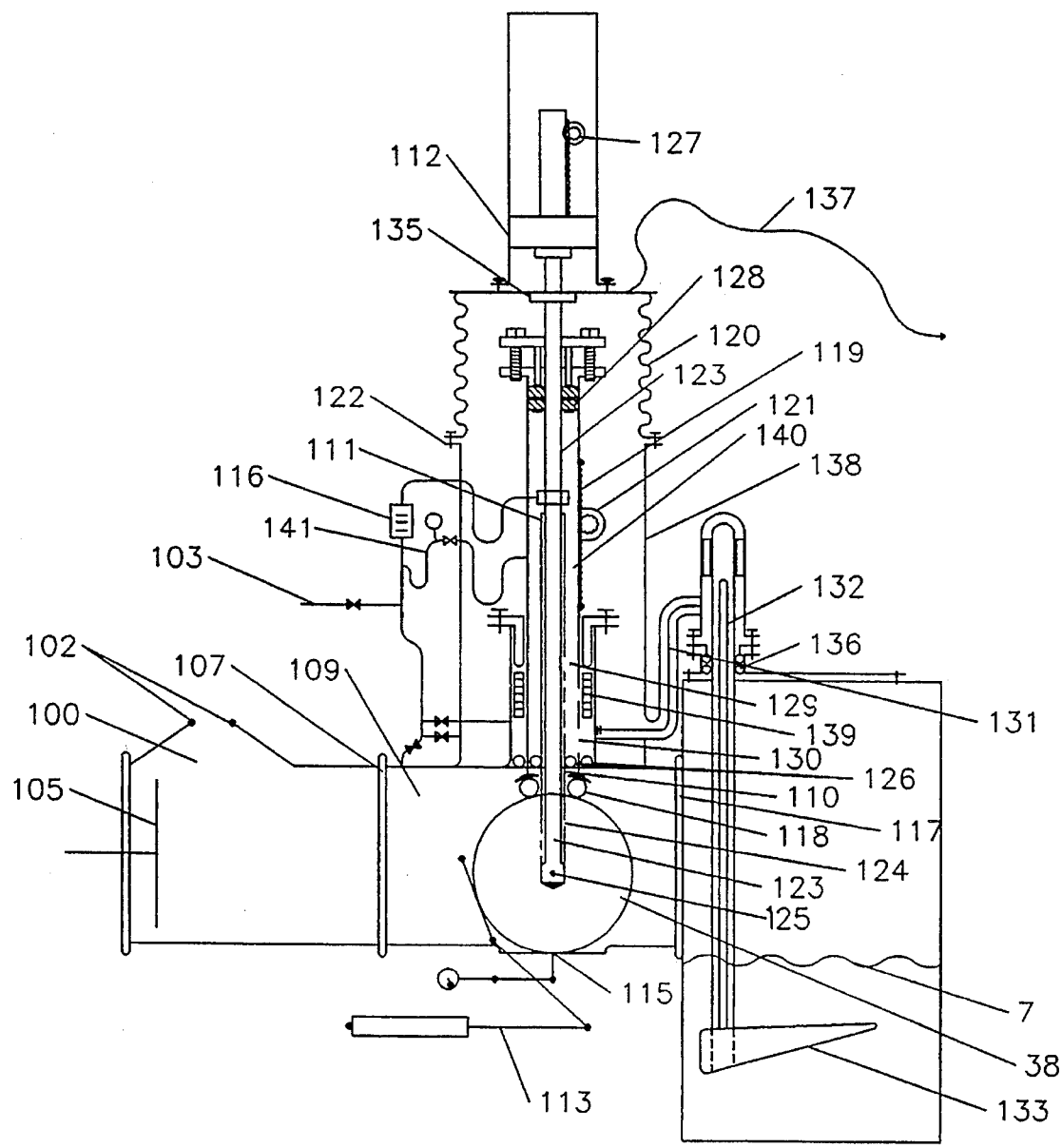
FIG. 7 shows a second embodiment of an inlet systems wherein a container is punctured and gas purged therefrom into a molten alloy.

In FIG. 7 we show an alternate inlet system wherein containers 38 of ultra hazardous gases or liquids may be punctured and gases and liquids purged out of the container 38 to enter below the surface of the molten alloy 7. In this system container 38 is placed in chamber 100, doors 102 closed and chamber 100 purged with inert gas from header 103. After purging slide gate 107, which is interlocked to open only with drill sleeve 119 and purge unit 111 in an uppermost position and pusher 113 in flat position, is opened and ram or pusher 105 pushes container 38 into position above scale 115. Slide gate 107 closes and chamber 109 is purged with inert gas from header 103. Scale 115 records weight and may be interlocked with slide gate 117 to prevent opening of slide gate 117 until preset weight reduction occurs.

With container 38 in place drill sleeve 119 is driven downward by gear and motor 121 to compress seal ring 118. With seal 118 compressed inert gas flow through flow controller 116 is activated to purge interior of drill shaft 123 through an opening into the shaft enclosed by rotatably sealed housing 122. Drill motor 112 and shaft pressure unit 127 co-operate to drill through container 38. Inert gas purge continues through sealed housing 122, exits through holes 125 to sweep through container 38 into drill shaft purge chamber 111 through holes 124 and out through openings 129 and 130 into line 131 leading into a hollow shaft of distributor foot 133. Distributor foot 133 is shown in more detail in FIG. 9. It is designed to secure complete gas contact with molten alloy 7.

Seal rings 126 which may be Orings act to movably seal drill sleeve 119 and hollow shaft drill 110. Seal rings 128 may be soft packing to movably seal shaft 123 in drill sleeve 119. Housing shaft seal 135 allows shaft to rotate and move up and down while sealing the inner chamber from the atmosphere. Housing purge line 137 may lead below molten alloy surface or to an external solvent scrubber of removal of trace leakages of hazardous gases.

Seal rings 139 which may be soft packing movably seal drill sleeve 119 to allow vertical movement to compress seal ring 118 against or container 38.

Inert purge line 141 leads into drill sleeve chamber 140 and purges hazardous gases out through holes 130 into the molten alloy. Gases go through hollow shaft 132 to exit the bottom of distributor foot 133. Seal 136 may be a soft packing seal pulled down tightly since shaft 132 is normally held stationary. Expansion joint 120 reduces upward stress on housing 138.

Figure 8:
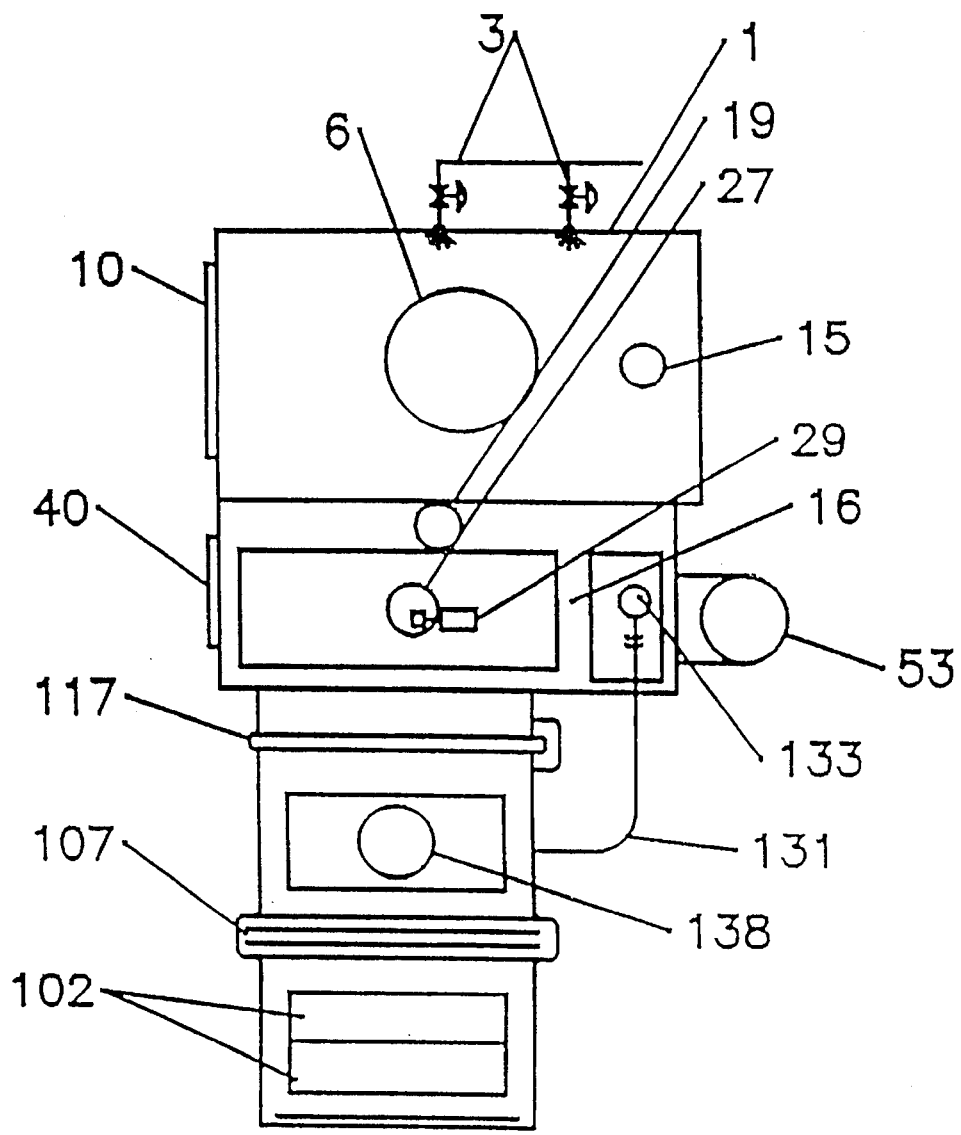
FIG. 8 shows a top view of the unit with the second embodiment of an inlet system.

In FIG. 8 we show a top view of dual chamber unit 1 modified to enlarge treatment chamber 16 to allow gas treatment through distributor 133 prior to dissolving the container 38 FIG. 7 and to modify the inlet system to allow puncturing and purging a container 38 as shown in FIG. 7. Charge doors 102 may be remotely or manually operated to seal closed after a container 38, FIG. 7 is charged. Inlet for container 38 to be pushed into the molten alloy 7, FIG. 7 is through slide gate 117. In this unit the container 38 would be pushed into alloy 7 after the ultra hazardous gas is purged into the molten alloy 7 through distributor foot 133. Side gate 117, housing 138, line 131 and off-gas line 53 have been previously discussed under FIG. 7 discussion. Other elements as indicated by the numbers have been discussed under FIG. 2 discussion.

Figure 9:
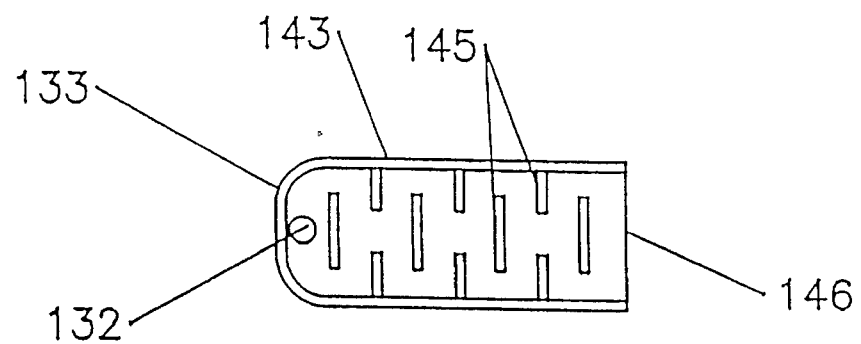
FIG. 9 shows a bottom view of the distributor foot for dispersing gas below the molten alloy surface.

In FIG. 9 we show a bottom view of distributor foot 133. The foot is preferably made of ceramic or ceramic coated steel. An outer enclosure 143 may be ½" to 1" in height and this inclosure plus baffles 145 causes gases emanating from hollow shaft 132 to travel a tortuous path around baffles 145 before exiting at a front 146 of foot 133. This arrangement insures excellent contact of gases with the molten alloy.

What is claimed is:

1. Process for molecular decomposition of ultra hazardous gas and liquids comprising:
    a) heating an aluminum alloy to molten state;
    b) feeding a container of said ultra hazardous gases and liquids to a top level of said molten alloy and immediately submerging said container with a hollow shaft dunking unit means; said dunking unit means being designed to provide a tortuous gas path above said container in said molten alloy;
    c) purging with inert gas through said hollow shaft while said dunker means is submerged under said molten alloy; and
    d) routing off-gas from said molten alloy through an off-gas treating means to insure a non-hazardous effluent gas.

2. Process for molecular decomposition of ultra hazardous gas and liquids as in claim 1 where said off-gas treating means comprises an oxidation unit followed by a liquid scrubber.

3. Process for molecular decomposition of ultra hazardous gas and liquids as in claim 1 where said off-gas treating means is an induction heated section of line carrying said off-gas.

4. Process for molecular decomposition of ultra hazardous gas and liquids as in claim 3 further comprising an air aspirating unit and a pilot light means to mix said off-gas with air and oxidize combustibles in said off-gas.

5. Equipment for molecular decomposition of ultra hazardous gases and liquids comprising:
    a) an aluminum alloy means with a melting point suitable for melting a metal container;
    b) a dual compartment unit with a first compartment equipped to maintain said alloy in a molten state;
    c) a second compartment separate from said first compartment with free flow of said molten alloy between said first compartment and said second compartment with level of said alloy acting to isolate an atmosphere above said alloy in said first compartment from said second compartment;
    d) a feeding means, a dunker means driven with a hollow shaft, and an inert gas purge means; said inert gas purge means allowing purging of air out of said feeding means to allow feeding of a container of said containerized ultra hazardous gases and liquids to a top surface of said alloy with minimum introduction of air; said dunker means being designed to immediately submerse said container in said alloy before said container melts in said alloy and to provide a tortuous gas path above the container;
    e) an off-gas line from said second compartment;
    f) an inert gas flow through said hollow shaft into said dunker;
    g) a treatment means connecting with said off-gas line and acting to treat gas in said off-gas line to allow environmentally safe discharge.

6. Equipment for molecular decomposition of ultra hazardous gas and liquids as in claim 5 wherein said treatment means comprises:
    a) a heated section of line in said off-gas line heated to above 500° C.;
    b) an oxidation unit at an exit of said heated section; said oxidation unit comprising a brick lined chamber, a gas burner, and a mixer to mix said off-gas with air and discharge adjacent to said gas burner, and;
    c) an atmospheric vent line from said oxidation unit.

7. Equipment for molecular decomposition of ultra hazardous gas and liquids as in claim 5 wherein said treatment means comprises a continuously burning pilot light means to burn any combustibles in said off-gas line at a point where said off-gas line is open to the atmosphere.

8. Equipment for molecular decomposition of ultra hazardous gas and liquids as in claim 5 wherein said treatment means comprises a liquid scrubber to scrub gas from said off-gas line before venting to the atmosphere.

9. Process for molecular decomposition of ultra hazardous gas and liquids as in claim 1 wherein composition of said aluminum alloy is as follows

| 50–100% | aluminum scrap |
| 0–50% | iron |
| 0–50% | copper |
| 0–20% | zinc |
| 0–20% | calcium |

10. Equipment for molecular decomposition of ultra hazardous gases and liquids comprising:
  a) an aluminum alloy means with a melting point suitable for melting a metal container;
  b) a dual compartment unit with a first compartment equipped to maintain said alloy in a molten state;
  c) a second compartment separate from said first compartment with free flow of said molten alloy between said first compartment and said second compartment with level of said alloy acting to isolate an atmosphere above said alloy in said first compartment from said second compartment;
  d) a container for said gases and liquids, a piercing means, a feeding means, a first and second feed compartment, and an inert gas purge means; said feeding means allowing moving said container through said first and said second feed compartment while purging with inert gas and piercing of said container with said piercing means comprising:
     1) a gas tight housing;
     2) a drill, a drill sleeve a sealing means, and a motor and gears to move said sleeve, to compress said sealing means to make a gas tight seal on said container after said container is placed in said second feed compartment;
     3) a dual wall drill means rotatably sealed in said drill sleeve, said dual wall drill means having an opening in said drill head communicating through said drill means with an external source of inert purge gas and said dual wall drill means having openings in an outer wall to allow purging contents of said container outward through a line from said drill sleeve;
  e) a ceramic disperser foot held with a hollow shaft in said molten alloy in said second compartment with said line from said drill sleeve communicating with said hollow shaft to allow dispersing said contents of said container below a surface of said alloy;
  f) a weigh scale means under said container in said second feed compartment to indicate when said container has been emptied;
  g) a pusher means to push said container out of said second feed compartment unit into said alloy after said container has been emptied and after said drill sleeve and said drill are moved into a retracted position;
  h) a dunker means to guide and submerse said container below said alloy in said second compartment;
  i) an off-gas line from said second compartment;
  j) an inert gas means to allow said inert gas flow through said hollow shaft into said dunker;
  k) a treatment means connecting with said off-gas line and acting to treat gas in said off-gas line to allow environmentally safe discharge.

11. Equipment for molecular decomposition of ultra hazardous gas and liquids as in claim 10 wherein said treatment means comprises;
  a) a heated section of line in said off-gas line heated to above 500° C.;
  b) an oxidation unit at an exit of said heated section; said oxidation unit comprising a brick lined chamber, a gas burner, and a mixer to mix said off-gas with air and discharge adjacent to said gas burner, and;
  c) an atmospheric vent line from said oxidation unit.

12. Equipment for molecular decomposition of ultra hazardous gas and liquids as in claim 10 wherein said treatment means comprises a continuously burning pilot light means to burn any combustibles in said off-gas line at a point where said off-gas line is open to the atmosphere.

13. Equipment for molecular decomposition of ultra hazardous gas and liquids as in claim 10 wherein said treatment means comprises a liquid scrubber to scrub gas from said off-gas line from said second compartment.

* * * * *